3,547,768
HEAT-SHRINKABLE PLASTIC FILM LAMINATES WITH A WAX MOISTURE - VAPOR BARRIER LAYER AND METHODS OF MAKING THE SAME
Ronald E. Layne, Waynesboro, Va., assignor to Reynolds Metals Company, Richmond, Va., a corporation of Delaware
Filed Nov. 17, 1966, Ser. No. 595,173
Int. Cl. B32b 9/04, 27/30; C09j 3/26
U.S. Cl. 161—234
12 Claims

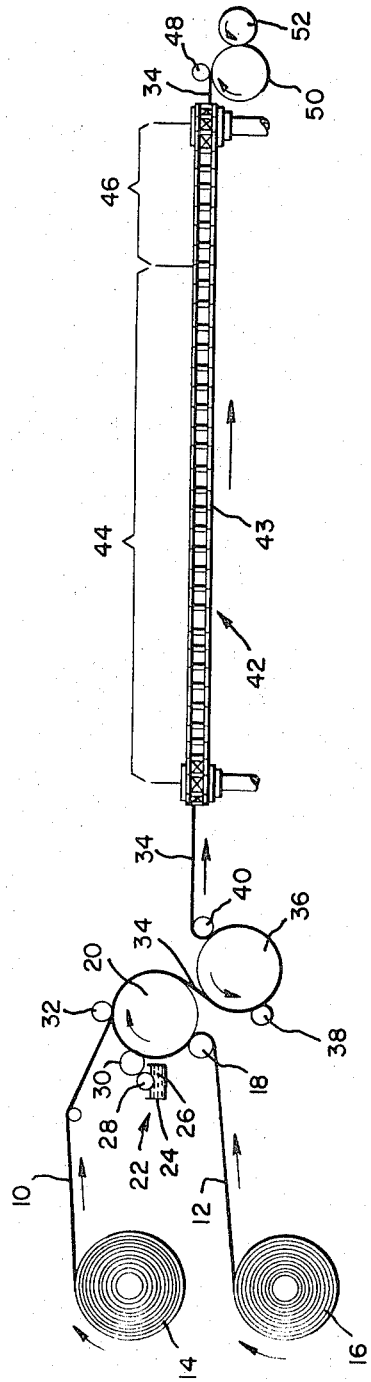
Dec. 15, 1970     R. E. LAYNE     3,547,768
HEAT-SHRINKABLE PLASTIC FILM LAMINATES WITH A WAX MOISTURE-VAPOR
BARRIER LAYER AND METHODS OF MAKING THE SAME
Filed Nov. 17, 1966
INVENTOR
RONALD E. LAYNE
BY *Glenn, Palmer, Matthews & Lyne*
ATTORNEYS United States Patent Office 3,547,768
Patented Dec. 15, 1970

ABSTRACT OF THE DISCLOSURE

A heat-shrinkable laminate comprises two molecularly oriented webs of polyvinyl chloride film with a thin layer of moisture vapor-barrier wax therebetween. The laminate is produced by applying the molten wax to one web, adding the second web, and then stretching while the wax is still molten to distribute the wax and orient the film. The laminate is suited for packaging applications requiring moisture- or oxygen-impermeability, transparency, heat-shrinkability, and heat-sealability.

---

This invention relates to heat-shrinkable plastic film laminates including a moisture-barrier layer, and to methods of making such laminates.

It is known that flexible, heat-shrinkable plastic film is useful for various packaging applications. Such film usually forms the final component of the package, enclosing one article, a number of articles, or one or more articles in combination with other elements of a package which may encase or otherwise support the articles.

In employing the flexible, heat-shrinkable plastic film in a typical package, the film is first disposed loosely about the other elements of the package and sealed. Preferably the sealing is effected merely by the application of heat to selected areas in which the films overlap, so as to cause the film to partially melt and weld in these areas. A film which may be sealed in such a manner is termed "heat-sealable." After the sealing, the elements of the package are usually placed in an oven, which may be in the form of an open-ended tunnel to facilitate continuous operation, and heated to a temperature such that the surrounding film shrinks sufficiently to enclose tightly the other elements of the package. It is apparent that the combination of heat-sealing and heat-shrinking avoids costly and complicated operations such as folding, stretching, smoothing, glueing, and the like.

Flexible plastic film having a high degree of heat-shrinkability is especially useful for packaging where virtually complete transparency, or "clarity," is desired. The film may be provided with an excellent initial clarity which is maintained during the shrinking operation, and, further, the shrinking eliminates wrinkles which would tend to obscure the contents of the package, with the result that the layer of film overwrap is hardly discernible to the viewer.

Such films, however, have not been found satisfactory in packaging applications in which the film overwrap must provide a barrier against gas, such as moisture vapor, oxygen, nitrogen, or carbon dioxide, as may be required in the packaging of cigarettes, cereals, bread, cheese, and many other products. For these applications it is often necessary to resort to materials, for example cellophane, which have the required impermeability to gas but which are not heat-shrinkable or comparable to certain highly heat-shrinkable films in terms of clarity and flexibility. Alternatively, various laminates may be relied upon to establish the necessary impermeability to gas. In the laminates, the barrier may be metal foil or a layer of wax bonded to sheets of paper or plastic film, or both, in various possible combinations. Of course, metal foil or paper renders a laminate opaque and non-heat-shrinkable, and laminates including wax have heretofore been attended by certain disadvantages.

In particular, while only a very thin layer of wax, probably of a thickness on the order of the width of a molecule, is necessary to provide the requisite barrier, it has hitherto been found difficult to apply the wax uniformly over a sheet of, for example, plastic film. Consequently, in order to compensate for void spaces caused by the non-uniform application of wax, it has been necessary to apply the wax in a layer about 0.3 to 0.5 mil thick to achieve the impermeability desired. Aside from the obvious disadvantage of wasting wax, this approach is undesirable because the bond formed by the wax with the film is considerably weaker than the bond formed by a film-to-film seal, with the result that the heat employed in a subsequent heat-sealing operation melts a considerable quantity of wax, which then commingles with the partially melted films and reduces the efficacy of the bond formed.

In accordance with the present invention, there is provided a heat-shrinkable plastic film laminate comprising two webs of plastic film having a very thin layer of barrier wax distributed uniformly therebetween. As will be described in more detail hereafter, the laminate is produced by integrating laminating and stretching operations in such a manner that a layer of molten barrier wax is disposed between two films and the film stretched while the wax is in the molten condition, thereby, in addition to molecularly orienting the film to effect heat-shrinkability, distributing the wax more uniformly over the inner surfaces of the webs of film and decreasing quite substantially the thicknesses of the film and the wax layer. The plastic films employed in such laminates can be of any material which allows the film to undergo a substantial degree of stretching to achieve molecular orientation, such as polyvinyl chloride, polyvinyl acetate, polyethylene, polypropylene, polyvinyl alcohol, polyvinylidene chloride, rubber hydrochloride, polyamide, polyester, styrene, and vinyl nitrile rubber. Polyvinyl chloride has been found especially suitable, and will be considered hereafter to exemplify the type of films which can be employed in the laminates.

The barrier wax employed in the laminates according to the invention must be in the molten condition within the formative temperature range of the plastic film. (As used herein, the terms "molten" and the like are not intended to apply only to substances in the liquid state, but also to describe substances which, due to their partial melting, amorphous nature, or otherwise, are uniformly flowable. Moreover, the term "formative temperature range," as used herein, means that range of temperatures at which a particular plastic film can be permanently enlarged by stretching, yet, when so enlarged, will retain its molecular orientation.) Examples of suitable waxes are microcrystalline and paraffin waxes, possibly in combination with other compounds, for example, polyethylene, ethylene vinyl acetate, Hercules products such as Foral 85, Staybilite Ester 5, Pentalyn A, or Poly-pale ester, oily plasticizers such as dioctyl adipate, mineral oil, and vegetable and animal waxes. Microcrystalline wax has been found especially suitable, and will be considered hereafter to exemplify the type of barrier wax which can be employed in the laminates.

For a better understanding of the invention, and of its other advantages, reference is now made to the accompanying drawing, which is to be regarded as illustrative only. The sole figure of the drawing is a diagrammatic elevation view of laminating apparatus according to the invention. The arrows indicate the direction in which the film or rolls are moving or rotating.

Webs 10, 12 of polyvinyl chloride film are unwound from supply rolls 14, 16 respectively. The webs may have been formed by any convenient process, as for example band-casting or extruding, and may have a significant degree of molecular orientation, such as might be caused by stretching over a gaseous mandrel after extrusion. The webs would normally have widths on the order of 2 to 6 feet and thicknesses on the order of 1 to 3 mils.

Web. 12 passes around tensioning roll 18 and then proceeds around chrome laminating roll 20, which has a diameter on the order of about 1 to 3 feet. At the rear of laminating roll 20 is wax-applying system 22 consisting of heated through 24 containing molten wax 26, wax supply roll 28 partially immersed in molten wax 26, and rubber transfer roll 30. To ensure a uniform, adequate wax pickup, the surface of roll 28 is preferably matted, scored, or sandblasted. Rotation of rolls 28 and 30 deposits upon the surface of web 12 a uniform layer of molten wax having a thickness of about 0.08 to 0.10 mils. For reasons given hereafter, roll 30 is slightly narrower than webs 10, 12, and is centered therewith, so that no wax is deposited within about 1 to 3 inches of each edge of 12.

Proceeding around laminating roll 20, web 12 is urged against web 10 in the nip of pressure roll 32 and laminating roll 20, with the molten wax being between webs 10 and 12. Roll 20 is heated, as for example internally by an oil or water circulating system, to a temperature such that the microcrystalline wax remains molten and the webs 10, 12 are brought to a temperature within their formative temperature range. (This range would of course vary for different film compositions and thicknesses, normally being about 120° F. to about 270° F.) In this manner, webs 10, 12 are bonded to form laminate 34. While the wax layer in laminate 34 is still molten and adheres to webs 10, 12 to a limited extent, the edges of the webs, where there is no wax, seal and weld together, thereby fixing the webs with respect to each other and preventing the molten wax from extruding from the edges of the laminate.

Leaving laminating roll 20, laminate 34 proceeds to chrome stretching roll 36, and thence around roll 36 and beneath smoothing roll 38 and tensioning roll 40. Stretching roll 36 has the same general dimensions as laminating roll 20, and is heated internally in a similar manner to about the same temperature, but is rotating up to about four times faster than roll 20. Consequently, laminate 34 is stretched in the longitudinal, or "machine," direction by a factor equal to the ratio of the speeds of rolls 36 and 20, thereby becoming molecularly oriented in that direction. Laminate 34, and each of its components, webs 10, 12 and the wax layer, are correspondingly reduced in thickness. At this time the flowable molten wax is spread uniformly over the inner surfaces of webs 10, 12.

Laminate 34 leaves tensioning roll 40 and proceeds to tenter 42, where clamps carried by chains 43 grip the edges of laminate 34. The chains move through tenter 42 with laminate 34, but diverge, so that laminate 34 is stretched in the lateral, of "cross," direction to about 1 to 3 times its original width.

There are two zones in tenter 42—air-heating zone 44 and air-cooling zone 46. In air-heating zone 44, where all of the lateral stretching occurs, hot air is blown over both surfaces of laminate 34 to maintain the film therein within its formative temperature range and to keep the wax molten. Thus, stretching laminate 34 in the lateral direction molecularly orients it in that direction, further reduces its thickness and the thickness of its components, and further spreads the molten wax uniformly over the inner surfaces of webs 10, 12.

The chain-carried clamps bring laminate 34 from air heating zone 44 into air-cooling zone 46, where the laminate is maintained at a constant width. In zone 46 laminate 34 is cooled by blowing relatively cold air over its surfaces.

At the end of air-cooling zone 46, the chain-carried clamps release the edges of laminate 34, which then passes between rubber nip roll 48 and internally cooled cooling roll 50. Cooling roll 50 cools laminate 34 to substantially room temperature. Finally, laminate 34, with the microcrystalline wax layer now solidified and uniformly distributed, is wound onto rewind roll 52. The final polyvinyl chloride laminate is on the order of 0.5 to 1.0 mils thick.

While the laminate produced in accordance with the process just described will be biaxially oriented, i.e., will have its molecules oriented in both the longitudinal and the lateral directions, it will be understood that by the omission or bypass of tenter 42 the laminate may be preferentially oriented in the longitudinal direction. If such preferential orientation is desired, laminate 34 would pass from tensioning roll 40 directly to rewind roll 52.

In order that the final laminate 34 have a uniformly high resistance to penetration by moisture vapor, the several inches having the film-to-film bond (and hence no wax barrier layer) are trimmed from the edges thereof. This can be done in a subsequent operation, or by slightly modifying the apparatus described, prior to winding the laminate on rewind roll 52.

In the manner just described, the invention provides for stretching the plastic film of the laminate with the wax therebetween in a molten and flowing condition and in intimate contact with the film. This spreads the wax uniformly over the inner surfaces of the wabs of film, thereby eliminating or at least minimizing the formation of pockets where the wax was not applied or adhered to the film. Any such pockets would result in cloudy or blotched regions of poor clarity.

The simultaneous stretching of the film with the wax molten ensures that the two webs in the final laminate will have similar heat-shrinking characteristics, and tends to remove wrinkles which may be present in the initial laminate just after the two webs are brought together.

In accordance with the invention, the wax layer of the laminate may be quite thin, yet sufficiently uniform to still afford a barrier against penetration by moisture vapor. The thinness of the wax barrier layer endows the laminate with good clarity and an effective bond between the webs, and reduces interference of the wax with subsequent heat-sealing operations.

For example, the wax barrier layer may be as thin as 0.015 to 0.03 mil and still provide a moisture vapor transmission rate (MVTR) of less than 1, or even as low as 0.5, gram per 100 square inches per 24 hours. Such an MVTR is comparable to that provided by the cellophane commonly used in packaging applications (e.g. cigarettes) requiring transparency and a low MVTR. Cellophane, however, is "crinkly," has a clarity inferior to that of the PVC-microcrystalline wax laminate produced in accordance with the present invention, and is not heat-shrinkable. The PVC-microcrystalline wax laminate produced in accordance with the present invention can be made to have a 250° F. shrinkability in the longitudinal direction exceeding 40% and, if biaxial orientation is desired, a 250° F. shrinkability in the lateral direction exceeding 40%.

In an exemplary practice of the invention, each polyvinyl chloride film web was 2 mils thick and 14 inches wide, and the chrome laminating and stretching rolls were 18 inches in diameter and maintained at a temperature of 210° F. The laminating roll was rotated so as to have a surface speed of 15 feet per minute, while the stretching roll had a surface speed of 47 feet per minute. The microcrystalline wax, which had a melting point of 153° F., was applied to the inside surface of one web by manually applying a solid bar of wax to that surface where the web passed around the laminating roll, while leaving two inches from each edge of the web free of wax. The wax melted, and the pressure roll maintained the thickness of the wax layer passing thereunder at about 0.13 mil. The tenter, which was operating at a line speed of 42 feet per minute, stretched the laminate to increase its width from 12 inches to 27 inches. The air passing over the laminate in the air-heating zone had a temperature of 200° F. The laminate had a final thickness of 0.75 mil.

The following table lists various properties of two laminates according to the invention, a soft polyvinyl chloride formulation and a less plasticised, semi-soft polyvinyl chloride formulation, both having a barrier layer of Sunoco 5825 microcrystalline wax. For purposes of comparison, the table also includes corresponding properties of laminates formed by the same process, but without the wax layer, so that the webs were bonded directly together. In the table "MD" and "CD" represent "machine direction" and "cross-direction," respectively, while "ASTM" refers to standards established by the American Society for Testing and Materials, as published in the 1964 edition, Part 27, "Plastics—General Methods of Testing."

perature, and removed from the oven. The percent shrinkage in a given direction, is, for each specimen, the amount of shrinkage divided by the original dimension and multiplied by 100. The final percent shrinkage in this given direction is the average of the two values.

As used herein, the "moisture vapor transmission rate" (MVTR) is that determined in accordance with ASTM E96–63T, Procedure E, as follows: A 50 ml. calcium chloride layer is spread into an aluminum test dish of such a size that the layer is at least 12 mm. thick and comes within 6 mm. of the dish top. An 8 inch by 8 inch specimen of the film is spread over the top of the dish and sealed to its rim by double-faced tape. The sample thus formed is conditioned for 16 hours at 100° F. and 90–95% relative humidity, conditioned for 4 hours at 73° F. and 50% relative humidity, and weighed. Then the sample is conditioned for 68 hours at 100° F. and 90–95% relative humidity, conditioned for 4 hours at 73° F. and 50% relative humidity, and weighed. The MVTR is the weight gain converted to grams per 100 square inches per 24 hours.

| Characteristic | Film, units | Soft PVC; no wax MD | CD | Soft PVC; wax barrier MD | CD | Semi-soft no wax MD | CD | Semi-soft PVC; wax barrier MD | CD | ASTM |
|---|---|---|---|---|---|---|---|---|---|---|
| GENERAL PROPERTIES | | | | | | | | | | |
| Thickness | Mils×100 | 70 | | 83 | | 76 | | 82 | | D645–64T |
| MECHANICAL PROPERTIES | | | | | | | | | | |
| Tensile strength at break | P.s.i. | 16,200 | 8,000 | 9,900 | 8,300 | 14,500 | 11,100 | 9,900 | 8,000 | D882–64T |
| Elongation at break | Percent | 90 | 110 | 60 | 140 | 100 | 150 | 60 | 110 | D882–64T |
| Yield strength | P.s.i. | 5,800 | 2,800 | 4,700 | 2,600 | 5,400 | 4,000 | 5,700 | 3,200 | D882–64T |
| Internal tearing resistance | Grams/mil | 8 | 9 | 7 | 8 | 9 | 11 | 7 | 8 | D1922–61T |
| Seal strength: | | | | | | | | | | |
| Sentinel | Lbs./lineal in | 3.2 | 3.1 | 3.2 | 3.1 | 2.4 | 2.1 | 1.7 | 1.7 | D1789–60T |
| Vertrod | Lbs./lineal in | 3.7 | 2.9 | 3.6 | 3.1 | 3.1 | 3.4 | 4.2 | 3.4 | D1789–60T |
| Weldotron | Lbs./lineal in | 3.6 | 2.7 | 3.0 | 3.0 | 3.8 | 3.6 | 5.1 | 3.6 | D1789–60T |
| Seal range: | | | | | | | | | | |
| Sentinel | °F | 290–350 | | 300–355 | | 295–350 | | 305–350 | | |
| Vertrod | Heat/dwell | 2/2–10/10 | | 2/2–10/10 | | 2/2–10/10 | | 2/2–10/10 | | |
| Weldotron | Percent line voltage | 60–100 | | 60–100 | | 60–100 | | 60–100 | | |
| Impact resistance (30% shrink): | | | | | | | | | | |
| −10° F | Spencer | 200 | | 370 | | 145 | | 200 | | |
| 0° F | do | 185 | | 300 | | 110 | | 232 | | |
| 32° F | do | 125 | | 200 | | 120 | | 105 | | |
| 72° F | do | 215 | | 245 | | 180 | | 165 | | |
| Static coefficient of friction | | 3.8 | | (¹) | | 1.5 | | (¹) | | D1894–63 (B) |
| Kinetic coefficient of friction | | 2.9 | | | | 2.0 | | | | D1894–63 (B) |
| Orientation release stress (maximum), 250° F | P.s.i. | 370 | 185 | 355 | 175 | 405 | 225 | 395 | 170 | |
| OPTICAL PROPERTIES | | | | | | | | | | |
| Gloss (Gardner 45° head) | Percent | 82 | 82 | 57 | 58 | 93 | 92 | 87 | 87 | D523–62T |
| Haze (0 and 30% shrink) | Percent | 0.4 and 1.7 | | 0.72 and 1.1 | | 0.2 and 0.4 | | 0.3 and 0.6 | | D1003–61 (A) |
| PERMANENCE PROPERTIES | | | | | | | | | | |
| Shrinkage at— | | | | | | | | | | |
| 100° F | Percent linear change | 1 | 2 | 0 | 0 | 2 | 2 | 0 | 0 | D1204–54 |
| 150° F | do | 12 | 13 | 13 | 12 | 12 | 12 | 12 | 12 | D1204–54 |
| 200° F | do | 21 | 21 | 20 | 20 | 20 | 20 | 21 | 20 | D1204–54 |
| 250° F | do | 55 | 44 | 58 | 51 | 53 | 48 | 54 | 46 | D1204–54 |
| 300° F | do | 63 | 53 | 62 | 52 | 60 | 51 | 65 | 51 | D1204–54 |
| Moisture vapor transmission rate (0% shrink) | Gms./100 in.²–24 hours | 10 | | 0.7–1.3 | | 6 | | 0.7–1.3 | | E96–63T (E) |

¹ No slip.

It was found that the MVTR values for the laminates having a wax barrier layer were normally less than 1.0 grams per 100 square inches per 24 hours, and that higher values were attributable to imperfections produced by manual application of the wax.

As used herein, the "shrinkability" of a laminate at a given temperature and in a given direction is that determined in accordance with ASTM D1204–54 as follows: Two 10 inch by 10 inch specimens are cut from a web of film, one from a transverse edge, and the other from the center. After conditioning for 40 hours at 73.4° F. and 50% relative humidity, the specimens are sandwiched individually between two sheets of heavy paper dusted on their inner surfaces with talc, and the sheets of paper are paperclipped together. The sandwiches are placed horizontally in an oven, heated to a constant temperature, allowed to remain for 10 minutes, cooled to room tem- While present preferred embodiments of the invention have been illustrated and described, it will be understood that the invention may be otherwise variously embodied and practiced.

What is claimed is:

1. A heat-shrinkable laminate comprising two molecularly oriented webs of polyvinyl chloride film having disposed uniformly therebetween a layer of moisture vapor-barrier wax whose average thickness is less than about 0.03 mil. said wax being selected from the group consisting of microcrystalline and paraffin waxes.

2. The laminate of claim 1 wherein the molecules in said film are biaxially oriented.

3. The laminate of claim wherein the orientation of the molecules in said film is such that said laminate's 250° F. shrinkability in at least one direction exceeds 40%.

4. The laminate of claim 3 wherein said orientation of molecules in said film is such that said laminate's 250° F. shrinkability perpendicular to said direction exceeds 40%.

5. The laminate of claim 1 whose moisture vapor transmission rate is less than 1 gram per 100 square inches per 24 hours.

6. A process of producing a heat-shrinkable plastic film laminate substantially impermeable to moisture comprising the steps of:
- disposing a layer of molten moisture-barrier wax between two juxtaposed webs of plastic film;
- stretching said film at a temperature at which it is in a formative state and said wax is molten, thereby orienting the molecules of said film in the direction of stretching, flowing and distributing said wax into uniform and intimate contact with said film, and decreasing substantially the thickness of said film and said wax; and
- cooling said film and said wax, thereby solidifying said wax and adhering it to said film.

7. The process of claim 6 wherein said temperature is between 120° F. and 270° F.

8. A process of producing a heat-shrinkable plastic film laminate substantially impermeable to moisture comprising the steps of:
- applying a coating of molten moisture-barrier wax to a surface of a first web of plastic film;
- bringing the coated surface of said first web into contact with a second web of plastic film at a nip formed by a rotating laminating roll;
- passing said film and molten wax through said nip of said laminating roll;
- causing said film and molten wax to be at a temperature such that said film is in a formative state and said wax is molten;
- passing said film and molten wax through a nip formed by a stretch roll rotating faster than said laminating roll, thereby stretching said film so that its molecules are oriented in the direction of stretching, distributing said wax into uniform and intimate contact with said film, and decreasing substantially the thicknesses of said film and said wax; and
- cooling said film and said wax, thereby solidifying said wax and adhering it to said film.

9. The process of claim 8 wherein no wax is applied to the edges of said webs and said webs are bonded directly together at said edges.

10. The process of claim 8 wherein said first web passes around said laminating roll where said molten moisture-barrier wax is applied.

11. The process of claim 6 wherein said plastic film is polyvinyl chloride.

12. The process of claim 8 wherein said plastic film is polyvinyl chloride.

References Cited
UNITED STATES PATENTS

| | | | |
|---|---|---|---|
| 2,740,741 | 4/1956 | Vaughan et al. | 161—234X |
| 2,740,742 | 4/1956 | Vaughan I | 161—234X |
| 3,003,903 | 10/1961 | Vaughan II | 161—402X |
| 3,075,864 | 1/1963 | Anderson | 161—234X |

JOHN T. GOOLKASIAN, Primary Examiner

M. E. McCAMISH, Assistant Examiner

U.S. Cl. X.R.

156—229, 309; 161—247, 402